(12) United States Patent
Kobayashi

(10) Patent No.: US 11,022,017 B2
(45) Date of Patent: Jun. 1, 2021

(54) METHOD FOR OPERATING A CATALYST ARRANGEMENT OF AN INTERNAL COMBUSTION ENGINE AND CATALYST ARRANGEMENT

(71) Applicant: Vitesco Technologies GMBH, Hannover (DE)

(72) Inventor: Takayuki Kobayashi, Tokyo (JP)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 16/650,682

(22) PCT Filed: Sep. 13, 2018

(86) PCT No.: PCT/EP2018/074703
§ 371 (c)(1),
(2) Date: Mar. 25, 2020

(87) PCT Pub. No.: WO2019/063301
PCT Pub. Date: Apr. 4, 2019

(65) Prior Publication Data
US 2020/0318522 A1  Oct. 8, 2020

(30) Foreign Application Priority Data

Sep. 26, 2017 (GB) ..................... 1715515

(51) Int. Cl.
*F01N 11/00* (2006.01)
*F01N 9/00* (2006.01)

(52) U.S. Cl.
CPC .............. *F01N 11/007* (2013.01); *F01N 9/00* (2013.01); *F01N 2550/02* (2013.01);
(Continued)

(58) Field of Classification Search
CPC ...... F01N 11/00; F01N 11/007; F01N 3/2013; F01N 9/00; F01N 2240/16;
(Continued)

(56) References Cited

U.S. PATENT DOCUMENTS

| 5,357,752 A | 10/1994 | Lucchesi |
| 5,740,675 A * | 4/1998 | Shimasaki .............. F01N 3/222 60/274 |

(Continued)

FOREIGN PATENT DOCUMENTS

| DE | 102009054127 A1 | 5/2011 | |
| DE | 102016200017 A1 * | 7/2017 | ........... F01N 3/0842 |

(Continued)

OTHER PUBLICATIONS

Machine Translation of DE-102016200017-A1 (Year: 2017).*

(Continued)

*Primary Examiner* — Brandon D Lee

(57) ABSTRACT

The present invention relates to a method for operating a catalyst arrangement of an internal combustion engine and a catalyst arrangement. The catalyst arrangement includes an exhaust gas sensor having a sensor element and a sensor heating device heating the sensor element, and a catalyst having a catalyst heating device heating the catalyst. The method comprises determining a temperature of the catalyst heating device, activating the catalyst heating device for heating the catalyst, when the determined temperature of the catalyst is below a predetermined catalyst operating temperature threshold, and activating the sensor heating device for heating the sensor element, when the temperature of the catalyst exceeds the predetermined catalyst operating temperature threshold.

10 Claims, 2 Drawing Sheets

(52) U.S. Cl.
CPC .... *F01N 2560/026* (2013.01); *F01N 2560/20* (2013.01); *F01N 2900/1602* (2013.01)

(58) Field of Classification Search
CPC ........... F01N 2550/02; F01N 2560/026; F01N 2560/20; F01N 2900/1602; F01N 2900/1626; F01N 2900/1628; Y02T 10/12; Y02T 10/40
See application file for complete search history.

(56) References Cited

U.S. PATENT DOCUMENTS

| | | | |
|---|---|---|---|
| 8,479,494 | B2 | 7/2013 | Enomoto et al. |
| 9,410,466 | B2 | 8/2016 | Surnilla et al. |
| 2004/0086023 | A1 | 5/2004 | Smith et al. |
| 2005/0021214 | A1 | 1/2005 | Ohkuma |
| 2010/0132680 | A1 | 6/2010 | Iwahashi |
| 2010/0300068 | A1 | 12/2010 | Enomoto et al. |
| 2011/0277449 | A1* | 11/2011 | Gonze ..................... F01N 9/00 60/274 |
| 2014/0156172 | A1* | 6/2014 | Surnilla ................. F01N 11/00 701/104 |
| 2017/0074147 | A1 | 3/2017 | Sakashita |
| 2018/0136183 | A1* | 5/2018 | Hagiwara ............. F02D 41/123 |

FOREIGN PATENT DOCUMENTS

| | | |
|---|---|---|
| EP | 0773355 A1 | 5/1997 |
| EP | 2157303 A1 | 2/2010 |
| JP | 2003083128 A | 3/2003 |

OTHER PUBLICATIONS

International Search Report and Written Opinion dated Oct. 30, 2018 from corresponding International Patent Application No. PCT/EP2018/074703.

* cited by examiner

METHOD FOR OPERATING A CATALYST ARRANGEMENT OF AN INTERNAL COMBUSTION ENGINE AND CATALYST ARRANGEMENT

CROSS-REFERENCE TO RELATED APPLICATIONS

This application claims the benefit of PCT Application PCT/EP2018/074703, filed Sep. 13, 2018, which claims priority to Great Britain Application GB 1715515.1, filed Sep. 26, 2017. The disclosures of the above applications are incorporated herein by reference.

TECHNICAL FIELD

The present invention relates to a method for operating a catalyst arrangement of an internal combustion engine, and to a catalyst arrangement for an internal combustion engine.

BACKGROUND

Internal combustion engines emit exhaust gas containing toxic or environmentally unfriendly contents. Hence, catalyst arrangements are provided for treating said exhaust gas in order to at least partially reduce said toxic or environmentally unfriendly contents in the exhaust gas. Further, different kinds of exhaust gas sensors may be provided for detecting properties of the exhaust gas in order to control the catalytic arrangement. It is well-known to utilize a NOx-sensor, an oxygen sensor, an air-fuel ratio sensor and/or a particulate matter sensor in an exhaust system of the internal combustion engine for detecting said properties of the exhaust gas.

An exhaust gas sensor may include a sensor element that operates in a specific temperature range and, hence, that must be at least partially heated by, for instance, a heating device. However, said sensor element may be damaged by water contained in the exhaust gas due to water hammer when being heated. Water hammer may exert thermal stress onto the sensor element that may lead to, for example, cracks in the sensor element. Therefore, it should be ensured that, when the sensor element is heated, the exhaust gas is substantially free of water, i.e. the exhaust gas has reached the so-called dew point. Thus, it is preferable that the sensor element is heated to its sensor operating temperature only after reaching the dew point.

In prior art systems, several efforts have been taken to determine the dew point. For example, via a model contemplating some operating parameters of the internal combustion engine, the point of time when the dew point is reached may be properly estimated.

US 2010/0132680 A1 discloses an exhaust gas sensor heater control apparatus. A heater that heats a sensor element of the exhaust gas sensor is not powered immediately after engine start in an extremely low temperature state. Rather, the heater is activated when an engine coolant temperature has reached a temperature near an air-fuel ratio feedback control starting water temperature.

US 2017/0074147 A1 relates to a heater control device for exhaust gas sensors.

An exhaust system ambient temperature detection system for internal combustion engines is known from U.S. Pat. No. 5,740,675 A.

U.S. Pat. No. 8,479,494 B2 discloses an exhaust gas sensor control system and control method.

Further, an exhaust humidity sensor is known from U.S. Pat. No. 9,410,466 B2.

SUMMARY

It is an object of the present invention to provide a method for operating a catalyst arrangement and a catalyst arrangement capable of reducing the risk of a damage to a sensor element of an exhaust gas sensor due to moisture in the exhaust gas, capable of efficiently operate the catalyst with respect to energy consumption, and capable of providing freedom with respect to a mounting position of the exhaust gas sensor.

Said object may be achieved by the method of independent claim 1 and the catalyst arrangement of independent claim 7. Advantageous and preferred developments and embodiments of the present invention are specified in the dependent claims, as well as in the following description and the appended drawings.

The following invention is at least partially based on the realization that arranging an exhaust gas sensor, such as a NOx sensor, in a catalyst arrangement including a catalyst and a catalyst heating device for heating the catalyst may provide the advantage that a sensor heating device of the exhaust gas sensor may be activated in dependency of a temperature of the catalyst heating device of the catalyst. In particular, when the catalyst heating device of the catalyst exceeds a predetermined catalyst operating temperature threshold, it may be assumed that the exhaust gas passing through the catalyst arrangement has reached the dew point, such that the exhaust gas is substantially free of any moisture. Then, the sensor heating device of the exhaust gas sensor may be activated as the risk for any damage to the sensitive sensor element due to water hammer can be significantly reduced.

According to a first aspect of the present invention, a method for operating a catalyst arrangement of an internal combustion engine is disclosed. The catalyst arrangement includes at least one exhaust gas sensor having a sensor element and a sensor heating device configured to heat the sensor element above a predetermined sensor operating temperature threshold, and a catalyst having a catalyst heating device configured to heat the catalyst above a predetermined catalyst operating temperature threshold. The sensor operating temperature threshold is significantly greater than the catalyst operating temperature threshold. The method according to the first aspect of the present invention comprises determining a temperature of the catalyst, activating the catalyst heating device for heating the catalyst above the predetermined catalyst operating temperature threshold, when the determined temperature of the catalyst is below the predetermined catalyst operating temperature threshold, and activating the sensor heating device for heating the sensor element above the predetermined sensor operating temperature threshold, when the temperature of the catalyst exceeds the predetermined catalyst operating temperature threshold.

As mentioned above, integrating the exhaust gas sensor into a heated catalyst provides the benefit that it might be assumed that the exhaust gas is substantially free of any moisture and/or water when the catalyst temperature is above the predetermined catalyst operating temperature threshold, such that the sensor heating device for heating the sensor element may be activated with a significantly reduced risk of any damage to the sensor element due to, for instance, water hammer. In addition, the heat of the catalyst heating device that is primary configured to heat the catalyst may be further utilized to at least partially pre-heat the sensor element of the exhaust gas sensor. Hence, the temperature difference for heating the sensor element to its sensor operating temperature may be significantly reduced, as the starting temperature from which the sensor element needs to be heated until exceeding the predetermined sensor operating temperature threshold is much higher than in an arrangement where the exhaust gas sensor is arranged downstream of the catalyst. Therefore, the time and energy to heat up the sensor element up to its operating temperature may be shortened.

In an advantageous embodiment of the present invention, the sensor heating device includes a temperature-dependent resistor. Hence, the step of determining a temperature of the exhaust gas includes determining that the sensor heating device is deactivated, determining an actual electrical resistance of the temperature-dependent resistor of the sensor heating device, and estimating the temperature of the catalyst based on the determined actual electrical resistance of the sensor heating device. As the sensor element is at least partially integrated into the catalyst, the catalyst heating device at least partially heats the sensor element. Thus, the temperature of the catalyst may be at least partially similar to the temperature of the sensor element, such that the temperature of the catalyst may be at least partially determined or estimated by the temperature of the sensor element.

For example, the electrical resistance of the sensor heating device may be associated with a corresponding temperature of the sensor element. For instance, a look-up table or a diagram each associating the electrical resistance of the sensor heating device with the corresponding temperature of the sensor element may be provided in a control unit of the catalyst arrangement. Hence, the exhaust gas sensor may be used as a temperature sensor for detecting or estimating the temperature of the catalyst and, when the catalyst temperature exceeds the predetermined catalyst operating temperature threshold, the sensor heating device of the exhaust gas sensor may be activated.

According to a further preferred embodiment of the present invention, the method further comprises determining that the exhaust gas flowing through the catalyst arrangement is substantially free of any moisture, when the determined temperature of the catalyst is above the catalyst operating temperature threshold. Preferably, the catalyst operating temperature threshold defines a light-off temperature of the catalyst. In particular, in a preferred embodiment, the catalyst operating temperature threshold is in a range from about 150° C. to about 500° C.

In a further preferred embodiment of the present invention, the sensor operating temperature threshold is in a range from about 300° C. to about 1000° C. In particular, the exhaust gas sensor may be a NOx sensor, an oxygen sensor or a particulate matter sensor each including a sensor element configured to be heated above the sensor operating temperature threshold. For example, the sensor element may be made of a substrate into which the sensor heating device, which may be electrically actuated, is integrated and/or embedded.

According to a further aspect of the present invention, a catalyst arrangement for an internal combustion engine is disclosed. The catalyst arrangement comprises a catalyst configured to treat exhaust gas of the internal combustion engine, a catalyst heating device configured to heat the catalyst above a predetermined catalyst operating temperature threshold, at least one exhaust gas sensor mounted to the catalyst and having a sensor element configured to at least partially protrude into the catalyst and a sensor heating device configured to heat the sensor element above a predetermined sensor operating temperature threshold, and a control unit connected to the catalyst heating device and the at least one exhaust gas sensor and configured to perform a method according to the present invention. The sensor operating temperature threshold may be significantly greater than the catalyst operating temperature threshold.

Preferably, the at least one exhaust gas sensor is located downstream of the catalyst heating device. In particular, it may be preferred that the at least one exhaust gas sensor is located at a most downstream location of the catalyst heating device. This may ensure that the position of sensor detection is at a location where the sensor signal is indicating a significant value of the parameter of the exhaust gas to be detected by the at least one exhaust gas sensor.

In a preferred embodiment of the catalyst arrangement according to the present invention, the catalyst heating device is an electric heating device. For example, the catalyst heating device is a resistance heating device.

Alternatively or additionally, the at least one exhaust gas sensor is a Nox sensor, an air-fuel ratio sensor, an oxygen sensor, an Ammonia (NH3) sensore or a particulate matter sensor.

BRIEF DESCRIPTION OF THE DRAWINGS

Further features and aspects of the present invention will become apparent to the person skilled in the art by studying and executing the teachings of the present disclosure and by consideration of the appended drawings, in which.

DETAILED DESCRIPTION

The embodiments described in the following with respect to the drawings are preferred embodiments of the invention. However, in the embodiments described, the components of the embodiments each represent individual features of the invention which are to be considered independently of each other and which each develop the invention also independently of each other and thereby are also to be regarded as a component of the invention in individual manner or in another than the shown combination. Furthermore, the described embodiments may also be supplemented by further features of the invention already described.

Figure 1:
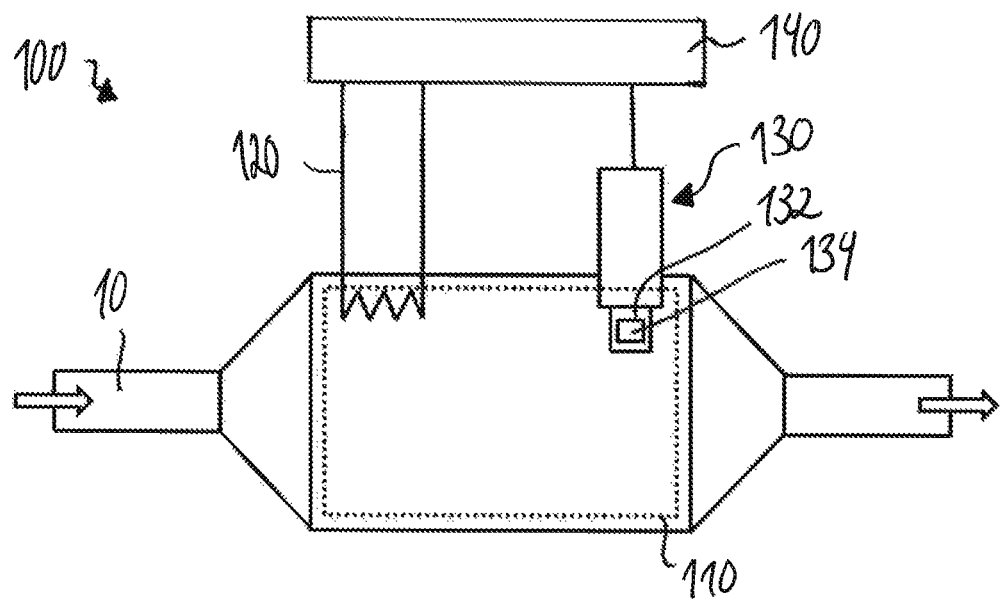
FIG. 1 shows a schematic illustration of an exemplary catalyst arrangement of the present invention.

FIG. 1 shows a schematic illustration of an exemplary catalyst arrangement 100 according to the present invention. The catalyst arrangement 100 of FIG. 1 includes a catalyst 110 (in FIG. 1 shown in dashed lines) disposed in an exhaust gas system 10 of an internal combustion engine (not shown). Exhaust gas of the internal combustion engine flows through the exhaust gas system. 10 in direction of the arrows of FIG. 1 and, hence, through the catalyst 110. The catalyst 110 may be any suitable catalyst to treat the exhaust gas of the internal combustion engine, such as, for example, a three-way catalyst, a selective reduction catalyst, a NOx storage converter or an oxidation catalyst.

The catalyst arrangement 100 further includes a catalyst heating device 120 configured to heat the catalyst 110. The catalyst heating device 120 is an electrical heating device and, for instance, is provided as a resistance heater for heating the catalyst 110 into its catalyst operating temperature range. The catalyst operating temperature range may range from about 150° C. to about 500° C.

The catalyst arrangement 100 of FIG. 1 further includes an exhaust gas sensor 130 mounted to the catalyst 110 and having a sensor element 132 configured to at least partially protrude into the catalyst 110. The exhaust gas sensor 130 further includes a sensor heating device 134 configured to heat the sensor element 132 above a predetermined sensor operating temperature threshold. The sensor heating device 134 is, for example, integrated or embedded into the sensor element 132 made of, for instance, a substrate. Specifically, the exhaust gas sensor 130 is configured to detect a predetermined parameter of the exhaust gas flowing through the catalyst 110. For instance, the exhaust gas sensor 130 is a NOx sensor, an air-fuel ratio sensor, an oxygen sensor or a particulate matter sensor.

The catalyst arrangement 100 of FIG. 1 further includes a control unit 140 connected to both the catalyst heating device 120 and the exhaust gas sensor 130. Particularly, the control unit 140 is configured to receive and provide signals to the catalyst heating device 120 and the exhaust gas sensor 130 for at least partially controlling both devices. For example, the control unit 140 is connected to the catalyst heating device 120 and the exhaust gas sensor 130 via a CAN-bus. Although not explicitly shown in FIG. 1, a catalyst heating device controller may be interconnected between the control unit 140 and the catalyst heating device 120 and a sensor control unit may be interconnected between the control unit 140 the exhaust gas sensor 130.

As can be further seen in FIG. 1, the exhaust gas sensor 130 is located at a most downstream location of the catalyst 110, such that the signals of the exhaust gas sensor 130 are as significant as possible. However, in alternative embodiments, the exhaust gas sensor 130 is provided at any suitable location within the catalyst 110.

Figure 2:
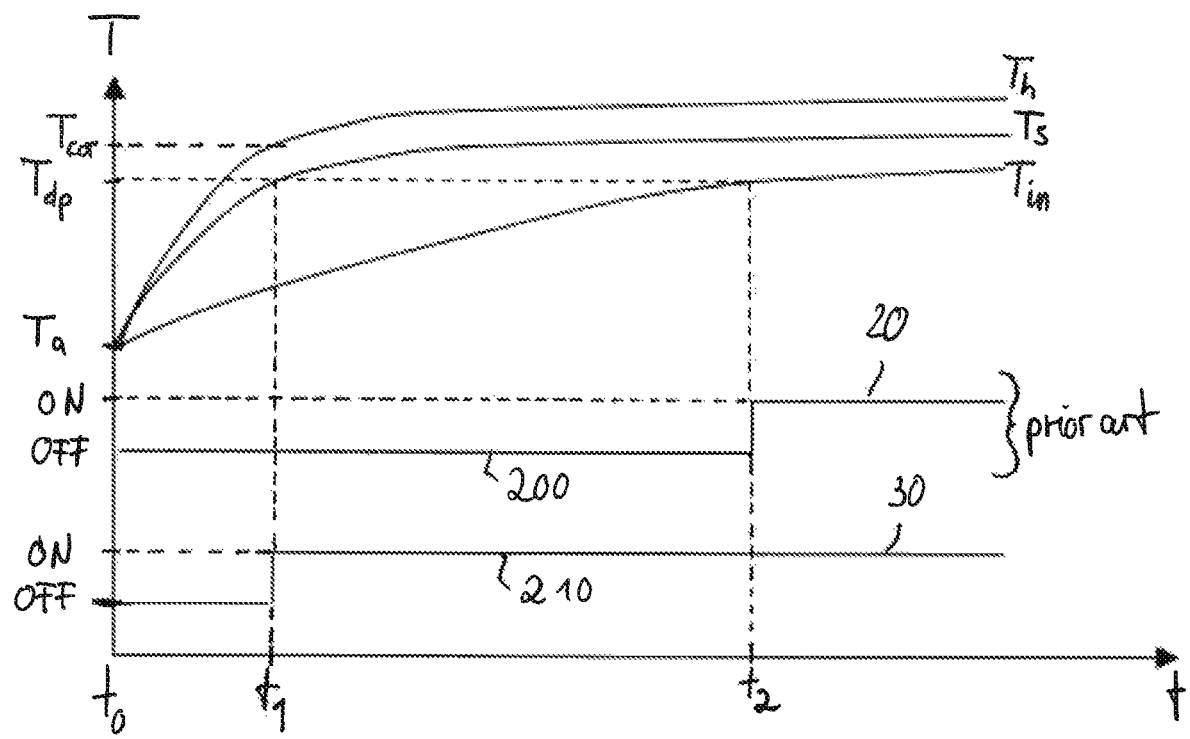
FIG. 2 shows a diagram illustrating several temporal progresses of temperatures of the catalyst arrangement of FIG. 1 and of the prior art.

Now referring to FIG. 2, a diagram illustrating several temporal progresses of temperatures of the catalyst arrangement of FIG. 1 and the prior art are shown. The line $T_{in}$ indicates the temporal progress of the exhaust gas temperature at an inlet of the catalyst 110. The line $T_s$ indicates the temporal progress of the exhaust gas temperature at a position of the exhaust gas sensor 130 within the catalyst 110 (see FIG. 1.). The line $T_h$ indicates the temporal progress of the exhaust gas temperature at a position of the catalyst heating device 120 (see FIG. 1).

When the internal combustion engine is cold started at $t_0$, the exhaust gas temperature $T_{in}$ at the inlet of the catalyst 110 starts at an ambient temperature $T_a$ and, then, rises continuously as the engine temperature rises. At the same time $t_0$, the catalyst heating device 120 is activated for heating the catalyst 110. Thus, line $T_h$ also starting at ambient temperature $T_a$ is lying above line $T_{in}$. Since the exhaust gas sensor 130 may be at least partially pre-heated by the exhaust gas also heated by the catalyst heating device 120, the line $T_s$ also starting at ambient temperature $T_a$ is lying above line $T_{in}$, but below line $T_h$.

As can be seen and derived from FIG. 2, the catalyst heating device 120 is activated at $t_0$ directly after engine start for heating the catalyst 110 into its catalyst operating temperature range as quick as possible. Therefore, the line $T_h$ of the exhaust gas temperature at the catalyst heating device 120 is rising with a great inclination and, then, after reaching a predetermined catalyst operating temperature threshold $T_{cot}$, the inclination of line $T_h$ is smaller. The temperature $T_{dp}$ of FIG. 2 refers to the so-called dew point temperature where it can be assumed that the exhaust gas flowing through the catalyst 110 is substantially free of any moisture.

The exhaust gas sensor 130, in particular the sensor element 132, may be heated by exhaust gas preheated by the catalyst heating device 120 disposed upstream of the exhaust gas sensor 130. Therefore, the temporal progress of the exhaust gas temperature $T_s$ at the sensor element 132 substantially follows the temporal progress of the exhaust gas temperature $T_h$ at the catalyst heating device 120.

In prior art systems where the exhaust gas sensor is not integrated into the catalyst 110 (see line 200 in FIG. 2), the sensor heating device 134 of the exhaust gas sensor 130 may be activated only when the exhaust gas temperature $T_{in}$ at the inlet of the catalyst reaches the dew point $T_{dp}$ at t2. At this activation time t2, there still might exist some risk of a damage to the sensor element 132 due to moisture within the exhaust gas.

According to the present invention (see line 210 in FIG. 2), the sensor heating device 134 of the exhaust gas sensor 130 may be activated at t1, i.e. when the exhaust gas temperature $T_s$ at the exhaust gas sensor 130 exceeds the dew point temperature $T_{dp}$. As the exhaust gas temperature $T_{in}$ at the inlet of the catalyst 110 is not influenced by the catalyst heating device 120, t1 is much earlier than t1. Therefore, the exhaust gas sensor 130 may reach its sensor operating temperature earlier than in prior art system.

In conclusion, as the exhaust gas sensor 130 is integrated into the catalyst 110 heated by the catalyst heating device 120, the exhaust gas sensor 130 is operated in a heated environment. This may lead to activation of the sensor heating device 134 as soon as the exhaust gas temperature $T_s$ at the exhaust gas sensor 130 exceeds the dew point temperature $T_{dp}$ at t1. As the exhaust gas has already passed the catalyst heating device 120 when reaching the exhaust gas sensor 130, the exhaust gas temperature Ts at the exhaust gas sensor 130 is higher than in prior art systems. Therefore, t1 is much earlier than t2.

Further, the exhaust gas pre-heated by the catalyst heating device 120 my at least partially pre-heat the sensor element 132, such that, after reaching the dew point temperature $t_{dp}$, the temperature difference for heating the sensor element 132 with the sensor heating device 134 above the sensor operating temperature threshold may be smaller, as the starting temperature of the sensor element 132 due to its pre-heating by the exhaust gas is higher. This may lead to less electrical energy consumption of the exhaust gas sensor 130 and to a shorter time of the sensor element 132 to reach its sensor operating temperature.

In addition, as the risk for damage to the sensor element 132 may be significantly reduced, the constraint for a sensor mounting angle is also significantly reduced as substantially no water will be present in the exhaust gas at the time of activating the sensor heating device 134. Specifically, in prior art devices, there is a risk of sensor element crack due to the presence of water or moisture in the exhaust line until reaching the dew point. Thus, it is required to mount the exhaust gas sensor 130 into the exhaust line 10 with a predetermined mounting angle for preventing the potential water or moisture to directly hit the sensor element 132 of the exhaust gas sensor 130. However, in the present invention, the sensor element 132 is mounted at a position of the heated catalyst arrangement 100 where the environment (i.e. the exhaust gas) may not include any water or moisture, such that the risk of a sensor element crack is reduced or, preferably, eliminated.

Figure 3:
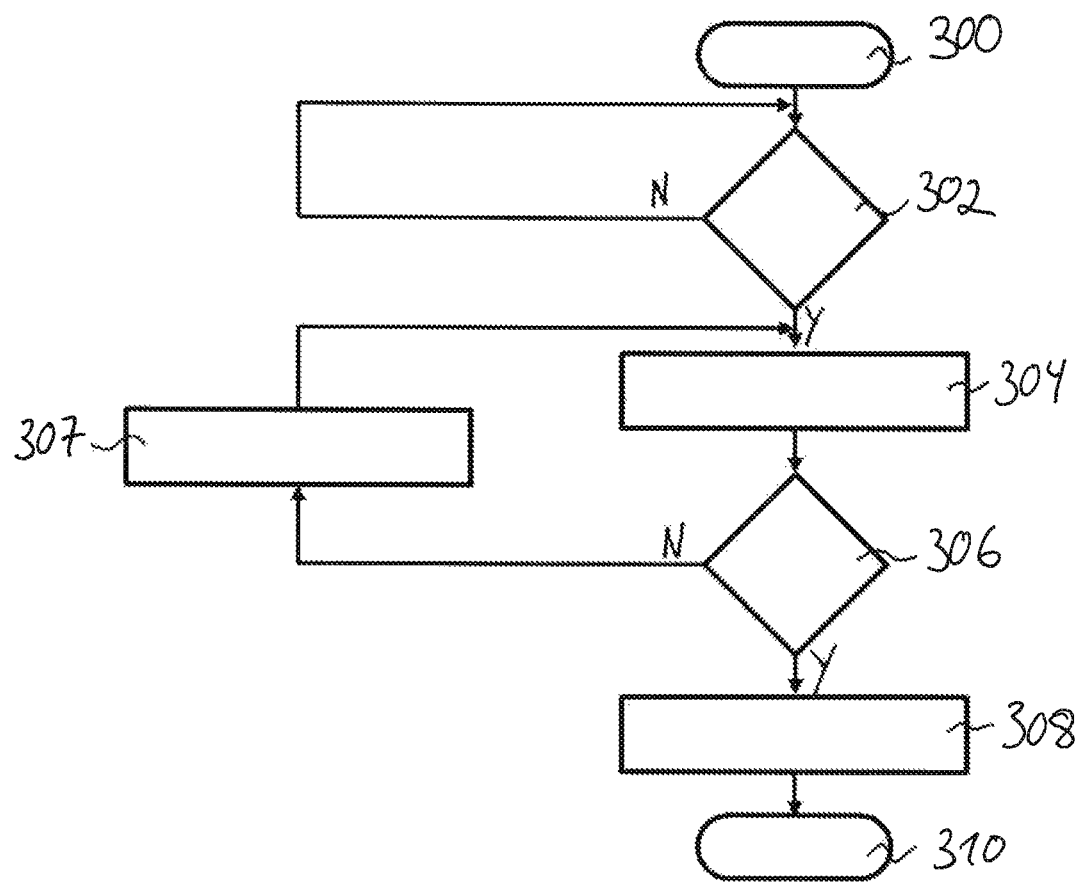
FIG. 3 illustrates a flow chart of a method for operating the catalyst arrangement of FIG. 1.

Referring now to FIG. 3, an exemplary flow chart of a method for operating the catalyst arrangement 100 of FIG. 1 is shown.

The method starts at step 300 and proceeds to step 302 where it is determined whether the internal combustion engine has been started. At step 302, if it is determined that the internal combustion engine has not been started, yet, the method maintains at step 302.

At step 302, if it is determined that the internal combustion engine has been started, the method proceeds to step 304 where the catalyst heating device 120 is activated. At the same time, at step 304, the sensor element temperature is determined. At this time, the sensor heating device 134 is still deactivated (OFF state). Determination of the sensor element temperature may be done by associating a temperature-dependent resistance of an electrical resistor of the sensor heating device 134 with a corresponding sensor element temperature.

Further, at step 304, it may be assumed that the sensor element temperature substantially corresponds to the exhaust gas temperature $T_s$ at the exhaust gas sensor 130. In addition, taking lines $T_s$ and $T_h$ of FIG. 2 into consideration, the exhaust gas temperature $T_h$ at the catalyst heating device 120 may be determined based on the sensor element temperature, as it can be assumed that $T_s$ and $T_h$ are substantially the same. The main process at step 304 is determining a temperature of the catalyst 110 which, in turn, substantially corresponds to the exhaust gas temperature $T_h$ at the catalyst heating device 120. Further, it may be considered to conduct a system calibration based on the above temperatures.

Then, at step 306, it is determined whether the catalyst temperature (corresponding to the exhaust gas temperature $T_h$ at the catalyst heating device 120) exceeds the dew point temperature $T_{dp}$. If not, the method proceeds to step 307 where the catalyst heating device 120 maintains in the activated state for further heating the catalyst 110. Subsequently, the method returns to step 304 and, then, proceeds again to step 306.

At step 306, if it is determined that the catalyst temperature exceeds the dew point temperature $T_{dp}$, the method proceeds to step 308 where the sensor heating device 134 is activated for heating the sensor element 134 above its sensor operating temperature threshold. Subsequently, the method ends at step 310.

In a situation in which the sensor element 132 is deactivated, i.e. the sensor element 132 is not heated by the sensor heating device 132, the temperature $T_s$ may be determined based on the resistance value of the sensor heating device 134. Said temperature $T_s$ may be used for a feedback control of the catalyst heating device 120. Thus, such feedback control may enable an efficient energy consumption as well as a safe heating management.

The invention claimed is:

1. A method for operating a catalyst arrangement of an internal combustion engine comprising:
   providing a catalyst:
   providing a sensor element which at least partially protrudes into the catalyst;
   providing a sensor heating device integrated into the sensor element;
   providing a catalyst heating device connected to the catalyst at a location upstream of the sensor element;
   determining a temperature of the catalyst heating device;
   determining a temperature of the catalyst;
   activating the catalyst heating device for heating the catalyst above a predetermined catalyst operating temperature threshold, when the determined temperature of the catalyst is below the predetermined catalyst operating temperature threshold; and
   activating the sensor heating device for heating the sensor element of at least one exhaust gas sensor above a predetermined sensor operating temperature threshold, when the temperature of the catalyst exceeds the predetermined catalyst operating temperature threshold, wherein the sensor operating temperature threshold is greater than the catalyst operating temperature threshold.

2. The method of claim 1, wherein the determining the temperature of the catalyst further comprises:
   determining that the sensor heating device is deactivated;
   determining an electric resistance of a temperature-dependent resistor of the sensor heating device; and
   determining the temperature of the catalyst based on the determined electric resistance of the sensor heating device.

3. The method of claim 1, further comprising determining that exhaust gas flowing through the catalyst arrangement is substantially free of moisture, when the determined catalyst temperature is above the catalyst operating temperature threshold.

4. The method of claim 1, wherein the catalyst operating temperature threshold defines a light-off temperature of the catalyst.

5. The method of claim 1, wherein the catalyst operating temperature threshold is in a range from 150° C. to 500° C.

6. The method of claim 1, wherein the sensor temperature threshold is in a range from 700° C. to about 1,000° C.

7. A catalyst arrangement for an internal combustion engine, the catalyst arrangement comprising:
   a catalyst for treating exhaust gas of the internal combustion engine;
   a catalyst heating device to heat the catalyst above a predetermined catalyst operating temperature threshold;
   at least one exhaust gas sensor mounted to the catalyst and having a sensor element which at least partially protrudes into the catalyst and a sensor heating device to heat the sensor element above a predetermined sensor operating temperature threshold, the sensor operating temperature threshold being greater than the catalyst operating temperature threshold; and
   an electronic control unit connected to and controlling the catalyst heating device and the at least one exhaust gas sensor, the electronic control unit activates the sensor heating device above the predetermined sensor operating temperature threshold when the temperature of the catalyst exceeds the predetermined catalyst operating temperature threshold;
   wherein the catalyst heating device is connected to the catalyst at a location upstream of the sensor element.

8. The catalyst arrangement of claim 7, wherein the sensor device is located downstream of the catalyst heating device.

9. The catalyst arrangement of claim 7, wherein the catalyst heating device is an electric heating device.

10. The catalyst arrangement of claim 7, wherein the at least one exhaust gas sensor is one of: a NOx-sensor, an air-fuel ratio sensor, an oxygen sensor, an Ammonia sensor, and a particulate matter sensor.

* * * * *